(12) United States Patent
Martin (10) Patent No.: US 10,203,953 B2
(45) Date of Patent: Feb. 12, 2019

(54) IDENTIFICATION OF DUPLICATE FUNCTION IMPLEMENTATIONS

(71) Applicant: Microsoft Technology Licensing, LLC, Redmond, WA (US)

(72) Inventor: Rudi Martin, Snohomish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/441,486

(22) Filed: Feb. 24, 2017

(65) Prior Publication Data

US 2018/0246717 A1 Aug. 30, 2018

(51) Int. Cl.
*G06F 8/75* (2018.01)
*H04L 9/06* (2006.01)

(52) U.S. Cl.
CPC ............ *G06F 8/751* (2013.01); *H04L 9/0643* (2013.01)

(58) Field of Classification Search
CPC ................................ G06F 8/751; H04L 9/0643
USPC .................................................. 717/120–123
See application file for complete search history.

(56) References Cited

U.S. PATENT DOCUMENTS

| | | | |
|---|---|---|---|
| 5,740,405 A | 4/1998 | DeGraaf | |
| 6,173,384 B1* | 1/2001 | Weaver | G06F 17/30949 370/229 |
| 6,230,313 B1* | 5/2001 | Callahan, II | G06F 11/3404 714/35 |
| 7,672,005 B1* | 3/2010 | Hobbs | H04N 1/41 345/543 |
| 7,747,584 B1* | 6/2010 | Jernigan, IV | G06F 17/30156 707/692 |
| 7,867,084 B2 | 1/2011 | Martinek et al. | |
| 7,957,952 B2 | 6/2011 | Sargaison et al. | |
| 8,965,859 B1 | 2/2015 | Ioffe | |
| 2001/0011349 A1* | 8/2001 | Garrison | H04L 9/0825 713/165 |
| 2002/0048368 A1 | 4/2002 | Gardner | |
| 2003/0135700 A1* | 7/2003 | Schultz | G06F 17/3002 711/154 |
| 2003/0177129 A1* | 9/2003 | Bond | G06F 9/445 |
| 2005/0210043 A1* | 9/2005 | Manasse | G06F 17/3089 |
| 2006/0190501 A1 | 8/2006 | Massironi | |
| 2007/0255758 A1* | 11/2007 | Zheng | H03M 7/00 |
| 2008/0005141 A1* | 1/2008 | Zheng | G06F 3/0608 |

(Continued)

OTHER PUBLICATIONS

"What is Bit Masking?", <https://stackoverflow.com/questions/10493411/what-is-bit-masking>, May 8, 2012, p. 1-3.*

(Continued)

*Primary Examiner* — Qing Chen
(74) *Attorney, Agent, or Firm* — Holzer Patel Drennan (57) ABSTRACT

A method for identifying duplicate machine code function implementations provides for identifying position-dependent bits within a first function included in a first executable image and masking the identified position-dependent bits to create a position-independent entity. The method further provides for applying a hashing function to the position-independent entity to generate a representative hash code and comparing the representative hash code to a number of hash codes in a table to identify at least one duplicate implementation of the function that is associated in memory with a second executable image.

16 Claims, 5 Drawing Sheets

(56) References Cited

U.S. PATENT DOCUMENTS

| | | | |
|---|---|---|---|
| 2009/0051485 A1* | 2/2009 | Corry | G06K 17/00 340/5.8 |
| 2009/0193210 A1* | 7/2009 | Hewett | G06F 17/30011 711/163 |
| 2009/0241098 A1* | 9/2009 | Lobo | G06F 8/4435 717/165 |
| 2009/0307251 A1* | 12/2009 | Heller | G06F 17/3015 |
| 2010/0274755 A1* | 10/2010 | Stewart | G06F 8/75 706/54 |
| 2011/0083019 A1* | 4/2011 | Leppard | H04L 9/002 713/189 |
| 2011/0225191 A1* | 9/2011 | Xie | G06F 17/30312 707/775 |
| 2013/0283245 A1* | 10/2013 | Black | G06F 8/433 717/130 |
| 2014/0244708 A1 | 8/2014 | Taine et al. | |
| 2016/0070832 A1* | 3/2016 | Boahene | G06Q 10/067 703/13 |
| 2016/0198158 A1* | 7/2016 | Wige | H04N 19/136 375/240.16 |
| 2016/0321049 A1 | 11/2016 | Morgan | |

OTHER PUBLICATIONS

Su et al., "Identifying Functionally Similar Code in Complex Codebases," 2016, ACM.*

"IEEE 100 the Authoritative Dictionary of IEEE Standards Terms, Seventh Edition," 2000, IEEE, p. 505, 506, and 668.*

"Generating position independent code with gas (-fPIC)", http://stackoverflow.com/questions/38192735/generating-position-independent-code-with-gas-fpic, Published on: Sep. 2, 2016, 2 pages.

* cited by examiner

IDENTIFICATION OF DUPLICATE FUNCTION IMPLEMENTATIONS

BACKGROUND

Software engineers are often tasked with large-scale debugging operations of executable or machine code for which corresponding human-readable source code is unavailable. For example, a gaming system manufacture may employ test engineers to adapt and debug executable or machine code designed for an old gaming system (e.g., Xbox 360) to allow such code to execute on a newer gaming system (e.g., Xbox One). In cases where the executable code is developed by a third party, source code may be unavailable.

SUMMARY

Implementations described and claimed herein provide systems and methods for identifying duplicate implementations of machine code functions. In one implementation, a method includes identifying position-dependent bits within a function included in a first executable image and masking the position-dependent bits to create a position-independent entity. The method further includes applying a hashing function to the position-independent entity to generate a representative hash code and comparing the representative hash code to a table of hash codes to identify at least one duplicate implementation of the function associated in memory with a second executable image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

DETAILED DESCRIPTION

In some situations, it can be useful to be able to quickly identify whether a problematic function in a first title (e.g., a video game) exists in any other known title. One primary challenge in identifying duplicate function implementations is that the same source code for a function may, if compiled multiple times, create multiple versions of machine code that include some bits that differ from one another. As a result, test engineers may not recognize a function as a duplicate of another.

In many instances, developers are tasked with debugging and/or translating large libraries of raw machine code, such as to enable execution of old code within a new hardware or software system. Often, debugging fixes, workarounds, and performance tweaks are targeted at the function level. In some cases, the same or similar functions are utilized in many different titles (e.g., different video games), such as due to use of third party component software, different versions of the same title, and different stock-keeping units (SKUs) of the same title (e.g., localized versions).

Since machine code is binary, developers often rely on inferential tools such as pattern recognition techniques, internally-developed heuristics, and metadata (when available), to tackle these debugging and translation challenges. However, the effectiveness of these and other inferential tools can be limited by the fact that the compilation of source code into raw machine code can introduce some information that is inconsistent across duplicate implementations of identical functions. For example, the same source code may be used to compile two different machine code implementations of a same function. The machine code implementations, also referred to herein as "duplicate function implementations", can be largely identical but include some bits that differ from one another based on where in memory each version was originally placed by a compiler. This original placement is sometimes based on the order in which functions are compiled within an executable image and/or the length of each individual function. Despite the existence of these position-dependent bits that vary from one implementation to another, the effect of invoking these duplicate function implementations is otherwise identical.

When debugging vast libraries of machine code, test engineers could benefit from the ability to quickly determine that a problematic function within one executable image is a duplicate implementation of a function that exists within another executable image. For example, it may take hours, days, or weeks for a test engineer to troubleshoot and fix an error resulting from execution of a function included within a certain title. Later, the test engineer may unknowingly be confronted with the task of de-bugging the same problem with respect to a duplicate implementation of the function within another title. In cases where the source code is unavailable, the test engineer may not recognize the two functions as identical (e.g., due to the presence of position-dependent bits) and, consequently, be unable to leverage the fact that a fix for the same problem has already been developed. This can result in many extra hours re-solving the same problems, leading to large-scale inefficiencies.

The herein described technology addresses the foregoing by providing systems and methods for identifying position-dependent bits within a raw machine code function (e.g., bits that may change from one compilation of the function to another), and masking those position-dependent bits to create a position-independent version of each function that can directly compared to other similarly-created position-independent functions. In some implementations, a hashing function may be applied to a masked function (e.g., a position-independent version of the function) to generate a representative hash code that is much smaller than the corresponding position-independent function. The hash code can easily be compared to other, identically-generated hash codes in a table to facilitate identification of any previously-examined duplicate function implementations of the function used to generate the representative hash code.

Figure 1:
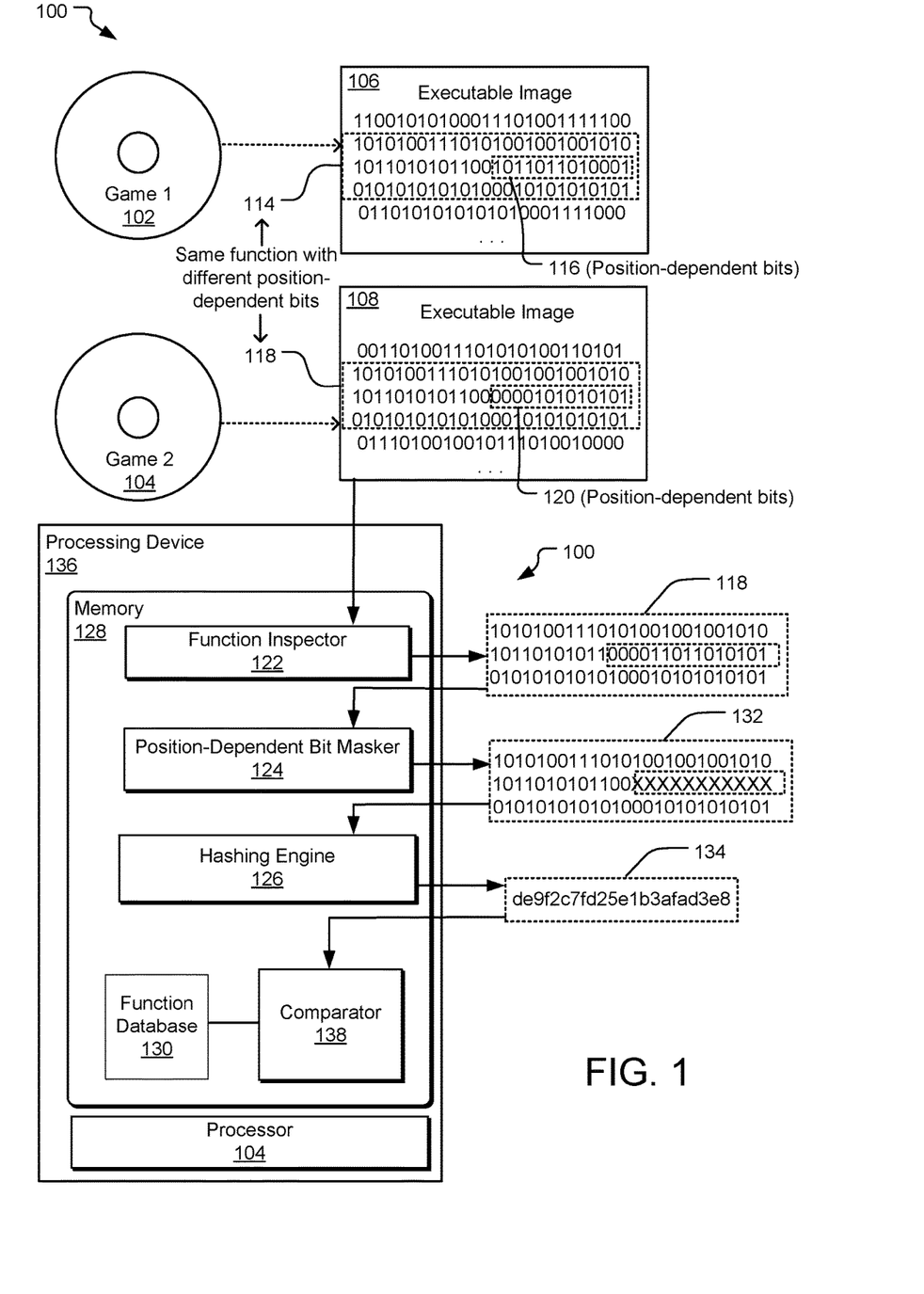
FIG. 1 illustrates a data management system for identifying duplicate function implementations of machine code within different executable images.

FIG. 1 illustrates a data management system 100 for identifying duplicate function implementations of machine code within different executable images. The data management system 100 includes a processing device 136 for reading executable images (e.g., executable images 106, 108) that are saved on one more tangible computer-readable storage media, such as example storage media 102 and 104. Each of the storage media 102 and 104 may store data associated with a title, such as a computer program or video game (e.g., Gears of War®). In general, a title may have multiple stock-keeping units (SKUs), such as an SKU for Germany, Asia, United States, etc. Each SKU may be shipped on a storage media, such as the storage media 102 or 104 (e.g., a DVD), that contains several data files, at least one of which includes an executable image, such as the executable images 106 and 108. In general, the term "executable image" refers to a data file that includes at least some machine code designed to be run on a target processing device. The executable image is formatted in a way that is specific to the target processing device so as to allow the target processing device to locate both the machine code and sufficient metadata to execute the machine code.

In FIG. 1, the storage media 102 and 104 are hard drive disks and the executable images 106 and 108 include video game data that has been compiled down into machine code (e.g., raw data that the processing device 136 is able to execute without further translation). For example, a video game may include one or multiple executable images representing different types of data including, without limitation, code, graphic and audio assets, localized text, etc. In other implementations, the executable images 106 and 108 are unrelated to gaming applications and may, for example, represent other computer-implemented applications, such as applications for web browsing and personal data creation and storage (e.g., word processing, digital photo storage, personal organization).

In general, the executable images 106 and 108 each contain a set of functions, where each individual function includes a contiguous sequence of machine code bits generated by a compiler and corresponding to at least one function written in a high-level programming language by an original author. In FIG. 1, the executable image 106 includes at least a function 114, while the executable image 108 includes a function 118 that is a duplicate implementation of the function 114. The executable images 106 and 108 may each include any number of other functions (not shown) in addition to the functions 114 and 118. Each of the functions 114 and 118 comprise raw machine code bits that may be considered a sequence of byte values (e.g., as when the functions are written to a file) or a sequence of low-level CPU instructions that are sometimes visualized textually in a human-readable form known as assembly.

In FIG. 1, the example functions 114 and 118 each include some bits that are identical to one another in value and position. These bits are referred to herein as "position-independent bits." However, the function 114 also includes a series of position-dependent bits 116 and 120 that may be different from a corresponding (e.g., like-positioned) string of position-dependent bits 120 within the function 118. For simplicity, the position-dependent bits 116 and 118 are each shown to be a contiguous sequence. However, the position-dependent bits may not actually be entirely contiguous within each of the functions 114 and 118. For example, the function 114 may include a series of different contiguous instructions and one or more position-dependent bits may be included in one, some, or all of the different instructions.

The processing device 136 includes at least a processor 104, memory 128, and a number of applications including a function inspector 122, a position-dependent bit masker 124, a hashing engine 126, and a comparator 138 that are stored in the memory 128 and executable by the processor 104 to facilitate identification of duplicate function implementations appearing within different executable images, such as the exemplarily duplicate function implementations represented by the functions 114 and 118.

When provided with an executable image, such as the executable image 108, the function inspector 122 makes a copy of the raw machine code bits in the executable image and parses the copied bits to identify various subcomponents of the executable image. Initially, the function inspector 122 extracts from the executable image a set of contiguous collections of machine code bytes corresponding to functions. Mechanisms for extracting machine code bytes of various functions are platform-dependent and may therefore vary from one implementation to another.

Subsequent to extraction of the machine code bytes, the function inspector 122 identifies boundaries of each different function in the executable image 108 and identifies logical positions of one or more position-dependent bits (e.g., the position-dependent bits 120) within each of the identified functions. In the some implementations, the function inspector 122 also identifies boundaries of individual instructions within each identified function and employs further logic to locate position-dependent bits (if any) within each identified instruction.

The function inspector 122 provides each identified function to the position-dependent bit masker 124 along within the identified locations of any of the identified position-dependent bits. For example, the function inspector 122 may provide the position-dependent bit masker 124 with markers indicating logical start and stop points for each contiguous sequence of position-dependent bits within a function, such as to identify the location of the position-dependent bits 120 within the function 118.

Identified functions meeting certain criteria (e.g., including position-dependent instructions and, in some cases, meeting predetermined length criteria), are then provided to the position-dependent bit masker 124 along with the identified locations of the position-dependent bits. The position-dependent bit masker 124 then forces the position-dependent bits to a known value, such as zero. For simplicity, FIG. 1 uses the letter X to represent positions of the "masked bits" within the position-independent entity 132. This "masking" of the position-dependent bits results in a position-independent entity 132 expressed in machine code that is—in general—identical to other similarly "masked" implementations of the same function regardless of where the function was originally compiled in the memory. This masked form (e.g., as in the position-independent entity 132) facilitates direct comparisons between functions that typically include position-dependent bits. Accordingly, some implementations of the data management system 100 save the position-independent function to the memory 128 to facilitate subsequent direct comparison to other, similarly-manipulated machine code functions.

In cases where the function 118 is examined as part of a large library (e.g., with thousands of titles comprising billions of individual functions), it can be prohibitively time consuming to compare the position-independent entity 132 (e.g., the masked machine code) from the function 118 to various other similarly-generated position-independent entities stored in a catalog. A hashing engine 126 provides a solution that dramatically decreases this computation time.

Specifically, the hashing engine 126 creates a hash code 134 based on the position-independent entity 132. Depending on the type of hash employed by the hashing engine 126, the hash code 134 may assume a variety of different sizes and forms that are much smaller than the corresponding machine code. In one example implementation, the hash code is a cryptographic hash. For example, the hashing engine 126 applies a Secure Hash Algorithm (SHA), such as a SHA-1 hash, to the position-independent entity 132, and the hash code 134 resulting from such operation is a 20-byte hash. Compared to this, the position-independent entity 132 and the function 118 may (in some cases) include many kilobytes of machine code.

Provided that the hashing engine 126 utilizes an algorithm that results in a unique-enough hash, it can be assumed that any identical hashes produced by the hashing engine 126 are a result of identical input to the hashing engine 126 (e.g., identical machine code sets).

The hashing engine 126 provides the generated hash code 134 to a comparator 138, and the comparator 138 queries a hash table in a function database 130 to determine whether any entries including the hash code 134 already exist. For example, the function database 130 may store a number of hash codes generated by the hashing engine 126 with each stored hash code further associated with a description of any function whose masked machine code implementation (e.g., the position-independent entity 132) generated the hash code. If, for example, the data management system 100 has already examined the function 114 with respect to the executable image 106, the function database may already store a hash code identical to the hash code 134 (e.g., because the functions 114 and 118 are duplicate implementations of one another). In this case, the comparator 138 may append the already-existing entry for the hash code 134 to include a reference to the executable image 108. As a result, the database entry corresponding to the hash code 134 includes a reference to both of the executable images 106 and 108 as well as any other executable image known to include a duplicate implementation of the same function. In addition, the database entry may include other function record information such as a name of the function 118 (if available), and a start address for placing the function in RAM during execution.

If the comparator 138 determines that the hash code 134 does not correspond to any hash code within the function database 130, the comparator 138 may create a new database entry that includes the hash code 134, a reference to the executable image 108, a start address for the function 118, and other function information.

Figure 2:
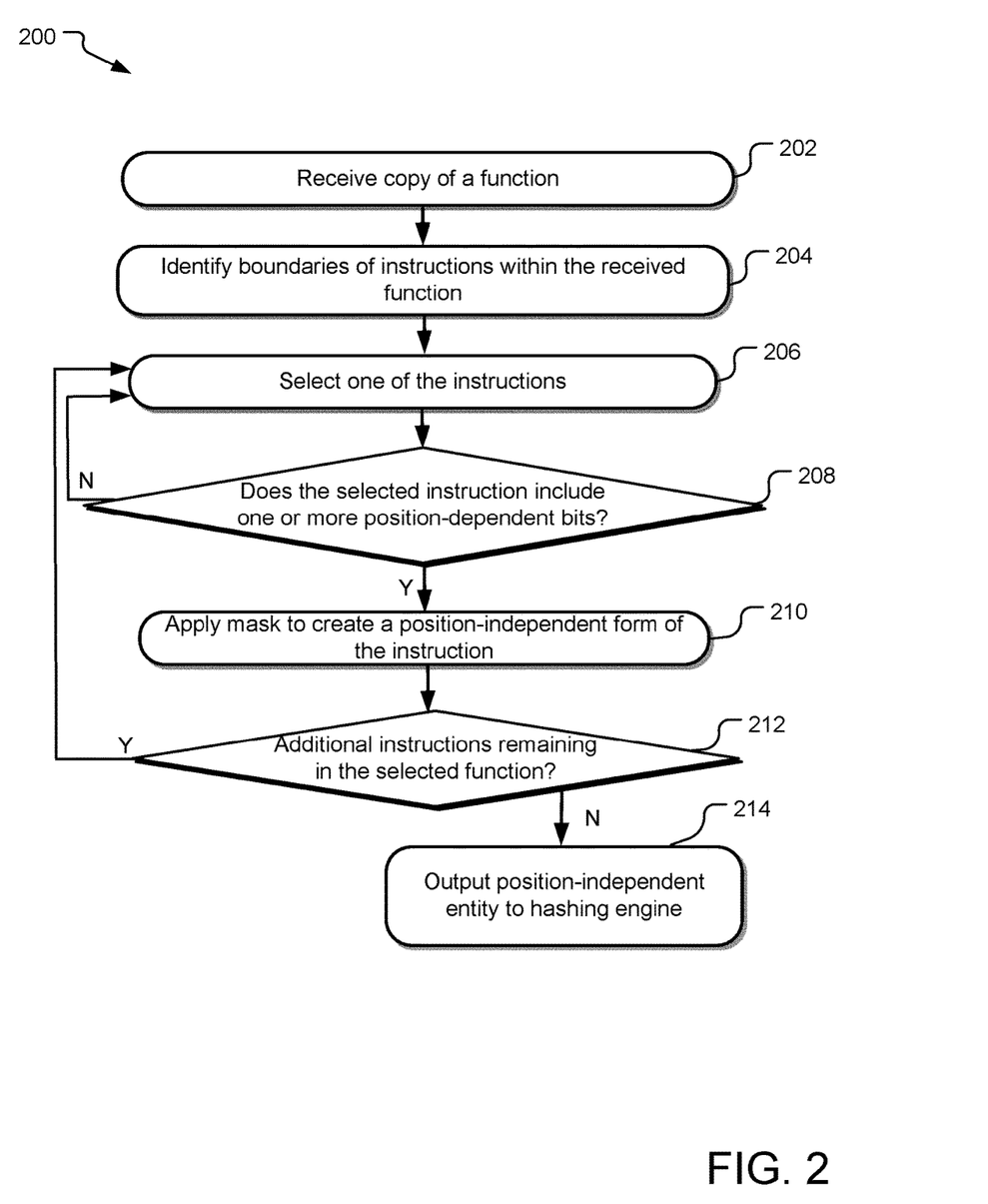
FIG. 2 illustrates example operations for identifying and masking position-dependent bits in a function to facilitate comparisons between functions with position-dependent bits.

FIG. 2 illustrates example operations 200 for identifying and masking position-dependent bits in a function to facilitate comparisons between functions with position-dependent bits. In one implementation, the example operations 200 of FIG. 2 are performed by the function inspector 122 and/or the position-dependent bit masker 124 of FIG. 1 using the same or similar techniques discussed with respect to FIG. 1. A receiving operation 202 receives a copy of a function that is to be translated into a position-independent form. The received function is in binary and is, in at least one implementation, machine code.

An identifying operation 204 identifies instruction boundaries within the received function. The task of identifying instruction boundaries can be more or less complex in different implementations depending on various factors such as the instruction encoding format utilized by a target CPU intended for execution of the function. In one implementation, the target CPU is a PowerPC (PPC) CPU, and all instructions are four bytes long. In this case, the identifying operation 204 identifies each contiguous four-byte segment as a different instruction. Other implementations may employ other methods for identifying function boundaries, such as relying on CPU-specific external libraries for decoding instructions.

A selection operation 206 selects one of the identified instructions, and a determination operation 208 analyzes the selected instruction to determine whether the selected instruction includes one or more position-dependent bits (e.g., bits that may change depending on a position that the corresponding function was compiled).

A variety of different techniques can be utilized to assess the existence or non-existence of position-dependent bits in the selected instruction. In cases where metadata is available for the function (e.g., metadata for a corresponding executable image), the metadata may itself be useful for identifying position-dependent bits. For example, some image file formats include metadata including a "relocation table" that specifies the positions of relocatable (e.g., position-dependent) bits (if any) in the file. If the event that such metadata is available, the position-dependent bits within each instruction can easily be verified.

In the event that such metadata is not available, the determination operation 208 may rely on other techniques, such as by drawing inferences based on prior, heuristic assessments relating to the form and content of other machine code instructions produced by a same compiler. A developer may, for example, examine a large body of code produced by a common compiler and reverse-engineer certain "signatures" of the compiler that affect the location of position-dependent bits. If, for example, a metadata relocation table is available in association with some machine code instructions generated by a compiler, a developer may be able to derive positions of position-dependent bits within other instructions produced by the same compiler, including those instructions written according to file formats for which such metadata is not available.

If a large enough body of code produced by the compiler is available, it may be possible for a developer to identify all forms of position-dependent instructions that the compiler is capable of producing and to further identify the locations of the position-dependent bit(s) with respect to each identified instruction form. In this case, the determination operation 208 may determine whether the selected instruction is a position-dependent instruction simply by assessing similarities between the selected instruction and a subset of pre-identified instructions for which the position-independent and position-dependent bits are known.

If the determination operation 208 determines that the selected instruction does not include position-dependent bits, the selection operation 206 selects a new instruction and repeats the above analysis to determine whether the new instruction includes any position-dependent bits. If, however, the determination operation 208 determines that the selected instruction does include position-dependent bits, a masking operation 210 applies a mask to the selected instruction to create a position-independent instruction.

The masking operation 210 may be achieved using a variety of suitable techniques. In one implementation, a sequence of bits is generated and applied to the selected instruction using a bitwise AND operation. For example, the masking operation 210 may generate a sequence of bits that is the same length as the selected (e.g., original) instruction. If a bitwise AND operation is utilized to apply the mask, bits in the selected instruction are retained when the corresponding bit in the mask includes a "1" value while bits in the selected instruction are discarded when the corresponding bit in the mask includes a "0" value. The result is a position-independent instruction with any identified position-dependent bits set to a known value.

In one implementation, the determination operation 208 determines an applicable mask to apply to the selected instruction by comparing the selected instruction to a known set (e.g., a heuristically-determined set) of position-dependent instruction types. For example, each instruction in the known set of position-dependent instruction types can be associated in memory with a specific mask and the masking operation 210 may compute the mask values for the selected instruction by looking up a corresponding instruction type in the table.

Once the masking operation 210 applies the mask to the instruction, another determination operation 212 determines whether there remain additional instructions within the received function that have not yet been examined by the determination operation 208. If there does exist remaining instructions in the function that have not yet been analyzed, the selection operation 206 selects an additional instruction and repeats the determination operation 208 and the masking operation 210 (if applicable). This loop continues until all instructions in the received function have been selected via the selection operation 206, analyzed per the determination operation 208, and masked by the masking operation 210.

When the determination operation 212 determines that there are no additional instructions to assess in the received function, an output operation 214 outputs a position-independent version of the function, also referred to herein as a position-independent entity. The position-independent entity includes position-independent bits that are identical to the original function (e.g., the position-dependent function) received at the receiving operation 202, but includes masked bits at locations corresponding to position-dependent bits in the original function. The masked bits are set to a known value.

Figure 3:
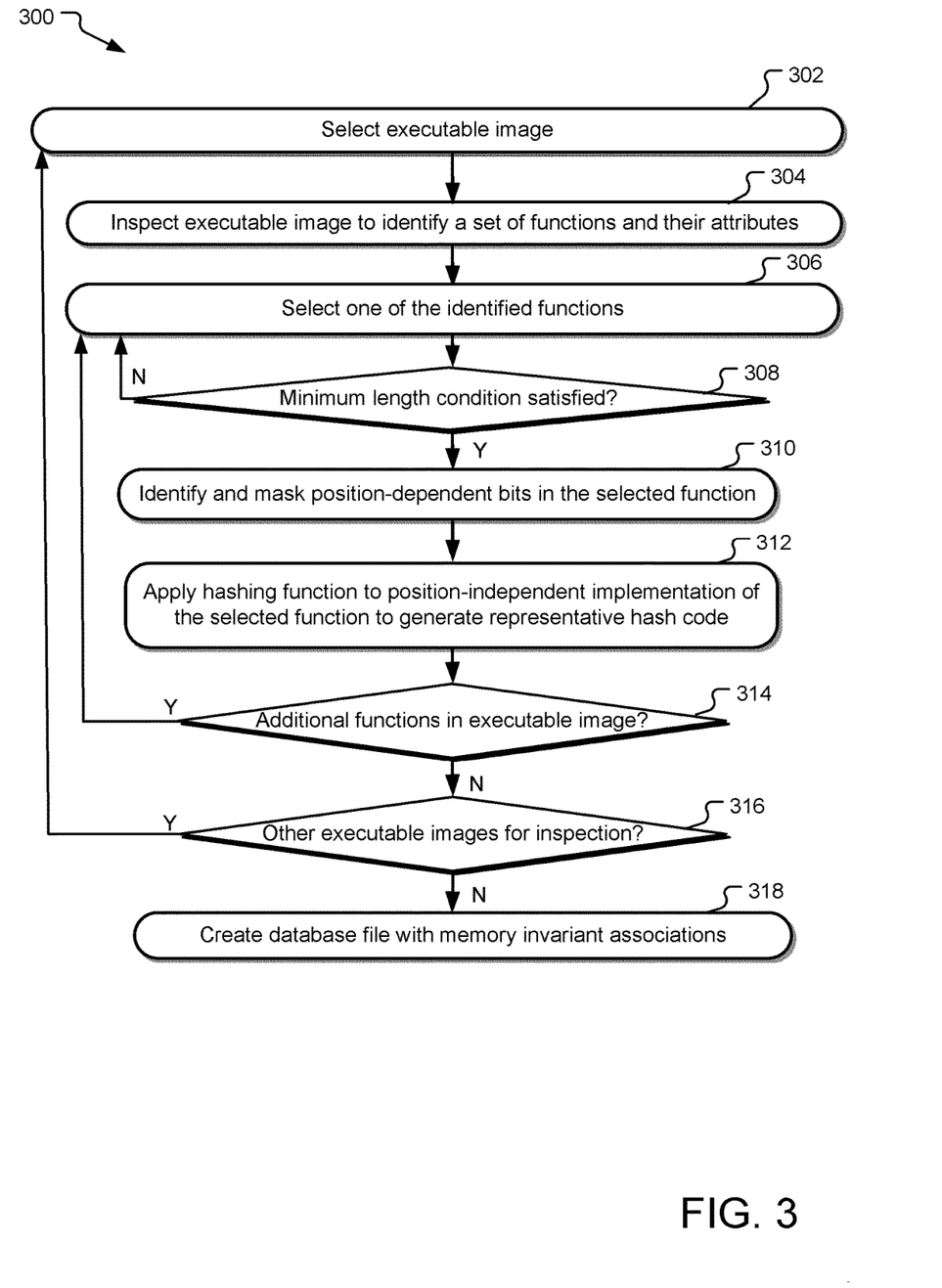
FIG. 3 illustrates example operations for creating a database file and using the database file that facilitates identification of duplicate function implementations.

FIG. 3 illustrates example operations 300 for creating a database file and using the database file that facilitates identification of duplicate function implementations. In general, the example operations 300 provide for conversion of position-dependent functions into position-independent entities, generation of a hash code representing each of the position-independent entities, and generation of a database file including various function attributes.

A selection operation 302 selects an executable image for inspection. Selection of the executable image may, in some implementations, entail decompressing and/or decrypting of data to make available raw bytes, including data representing machine code. In one implementation, a number of decompressed, decrypted executable images are placed in a queue to be subjected to the example operations 300. An inspection operation 304 inspects the executable image to identify boundaries for each of a plurality of functions within the executable image and associated function attributes. Function boundaries can be determined in a number of different ways including, for example, inspection of available metadata and/or employment of various heuristically-developed analysis techniques. In some cases, executable files include metadata that is used for exception handling. Frequently, this metadata includes information for identifying the boundaries of different functions. When boundary information for a given function is not available in metadata, other heuristically-developed techniques can be utilized to derive such information. If available, the inspection operation 304 may also determine function attribute data, such as the name of each function and a start address for loading the function into memory for execution.

Once function boundaries are identified via the inspection operation 304, another selection operation 306 selects a function from the identified set of functions for analysis and masking. A determination operation 308 determines whether the selected function satisfies a minimum length condition. For example, the minimum length condition is satisfied when the selected function has a total length in excess of a defined threshold. If the selected function does satisfy the predetermined length condition, the selected function is identified as one that is to be included in the function database and subjected to a position-dependent bit identification and masking operation 310. If, however, the determination operation 308 determines that the selected function does not satisfy the predetermined length condition, the selected function is discarded and ultimately excluded from the function database. Another function is then selected by the selection operation 306.

By discarding functions that do not satisfy the minimum length condition, the database is ultimately populated in a manner that reduces the statistical risk of receiving a "false positives" when using the database to identify duplicate function implementations. This is due to the fact that "masking" (e.g., as described via the operations of FIG. 2) can introduce some uncertainty if heuristic techniques are relied on to identify positions of position-dependent bits (e.g., as in cases where metadata is unavailable or does not include a relocation table). Further, a function call to another function may include a large number of position-dependent bits representing the storage address of the function called. Consequently, short functions that primarily call other functions may include very little un-masked data after being subjected to the position-dependent bit identification and masking operation 310. As a result, there exists a higher likelihood of detecting a false match (e.g., incorrectly identifying a function as a duplicate implementation of another function) when comparing one masked function with a large number of masked bits to another masked function with a large number of masked bits.

The minimum length condition specifies a function length that is variable in different implementations and may be selected based on a variety of considerations including without limitation the percentage of masked instructions as compared to total instructions in the function; the type of CPU that may execute the function; and the total number of executables or functions expected to be added to a database as compared to the average expected length of each function (e.g., the minimum function length may be selected to ensure that a majority or threshold percentage of functions generated by a compiler are added to the database).

Statistically, the likelihood of detecting a false match between functions decreases as the length of the function increases. This is due to the fact that longer functions include a greater number of unmasked instructions and unmasked total bits. By eliminating small functions from the database, the risk of falsely detecting duplication function implementations is mitigated at a small cost due to the fact that the shorter functions excluded from the database are, in some cases, easier to debug and process. In cases where the determination operation 308 determines that the function does not satisfy the minimum length condition, the selected function is discarded and the selection operation 306 selects another function of the identified functions for length consideration by the determination operation 308.

If the minimum length condition is satisfied, the position-dependent bit identification and masking operation 310 performs operations the same or similar to those described with respect to FIG. 2 (e.g., the example operations 200). The position-dependent bit identification and masking operation 310 outputs a position-independent entity (e.g., a masked version of the function), and this position-independent entity is then subjected to a hashing operation 312 that applies a hashing algorithm to the position-independent entity to generate a representative hash code. In one implementation, the representative hash is a fixed-length byte sequence that is statistically unique to the position-independent entity used to create the sequence.

A variety of hashing functions may be suitable for such application, and those used in cryptography may give better results due to the fact that bits in the output of a cryptography hash (such as SHA-1) are highly dependent on the value of every bit of the input, which lowers the risk that an identical representative hash may be generated for two different sets of input data.

After the hashing operation 312, a determination operation 314 determines whether there exist any additional functions in the executable image that have not yet been selected via the selection operation 306. The inspection operation 304, the selection operation 306, the determination operation 308, and the position-dependent bit identification and masking operation 310 are repeated (as applicable) for each one of the functions identified in the executable image by the selection operation 302.

Once all functions in the inspected executable image have been selected and any position-dependent functions have been masked, a determination operation 316 determines if there are any other executable images in a queue for the operations 302-312. If there are remaining executable images, the above-described operations are repeated with respect to each remaining image until all images have undergone such operations.

Once the determination operation 316 determines that there are no other executable images in the queue, a database creation operation 318 creates a new database file (or updates an existing database file) for storing each one of the generated representative hash codes in association with various function attribute data determined by the inspection operation 304. In one implementation, database creation operation 318 creates a database file that stores each of a number of generated hash codes in association with function attribute data. Function attribute data may include, for example, a function title (if available), a reference to the corresponding executable image that included the function that generated the hash code, and a function start address that indicates the address in memory that the function was intended to occupy on the target processing device. Since a title may not be available for all functions, a function start address can optionally be used as a unique function identifier and that is saved in association with the other function attribute data.

Figure 4:
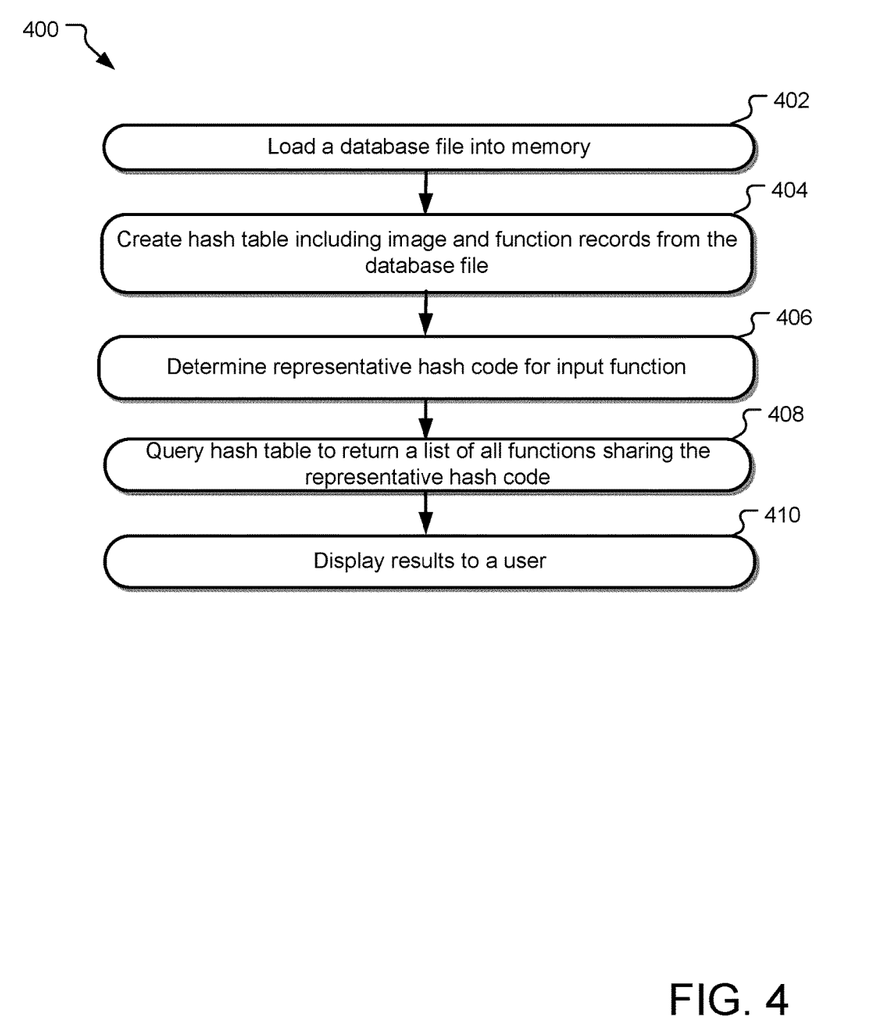
FIG. 4 example operations for populating a hash table and utilizing the hash table to identify duplicate function implementations.

In one implementation, the database creation operation 318 transforms the executable images and all collected function records (e.g., the generated hash codes and associated function attribute data) into a form that is invariant regardless of memory layout. For instance, an image table including a number of executable images may be created and each executable image may be assigned an index. Each generated hash code can then be associated with an index in the image table rather than a direct pointer to a record of the executable image in a specific memory location. FIG. 4 example operations 400 for populating a hash table and using the hash table to identify duplicate function implementations. In one implementation, a database file is created and populated according to the example operations 300 described with respect to FIG. 3. At the start of the example operations 400, a loading operation 402 loads the database file into memory. In one implementation, the loading operation 402 deserializes the database file into a collection of in-memory image and function records. A hash table creation operation 404 then creates an in-memory hash table (e.g., an example function database) that maps each generated hash code to a list of all corresponding images and function records that share that hash code.

During a query to search for duplicate function implementations in the hash table, a determination operation 406 receives an input function and determines a representative hash code for the input function. Generating the representative hash code may, for example, entail locating position-dependent bits in the function, masking the input function (e.g., to force the position-dependent bits to known values), and inputting the masked function to a hashing algorithm, such as in the same or a similar manner as generally described with respect to the operations 200 of FIG. 2 (for creating a position-independent entity by identifying and masking position-dependent bits) and/or hashing operation 312 of FIG. 3 (for applying a hash function to a position-independent entity to generate a representative hash code).

A querying operation 408 queries the in-memory hash table for a list of function records sharing the representative hash code generated based on the input function, and a presentation operation 410 displays a list of function records and/or associated information to a user. Since each function record stores a hash code and a reference to the executable image that created the hash code, the presentation operation 410 may present details about each identified duplicate function implementation and/or the corresponding executable image in which the duplicate implementation is found. Example details that may be displayed to a user include, for example, the executable title and/or location, title, SKU, a start address for the function.

Figure 5:
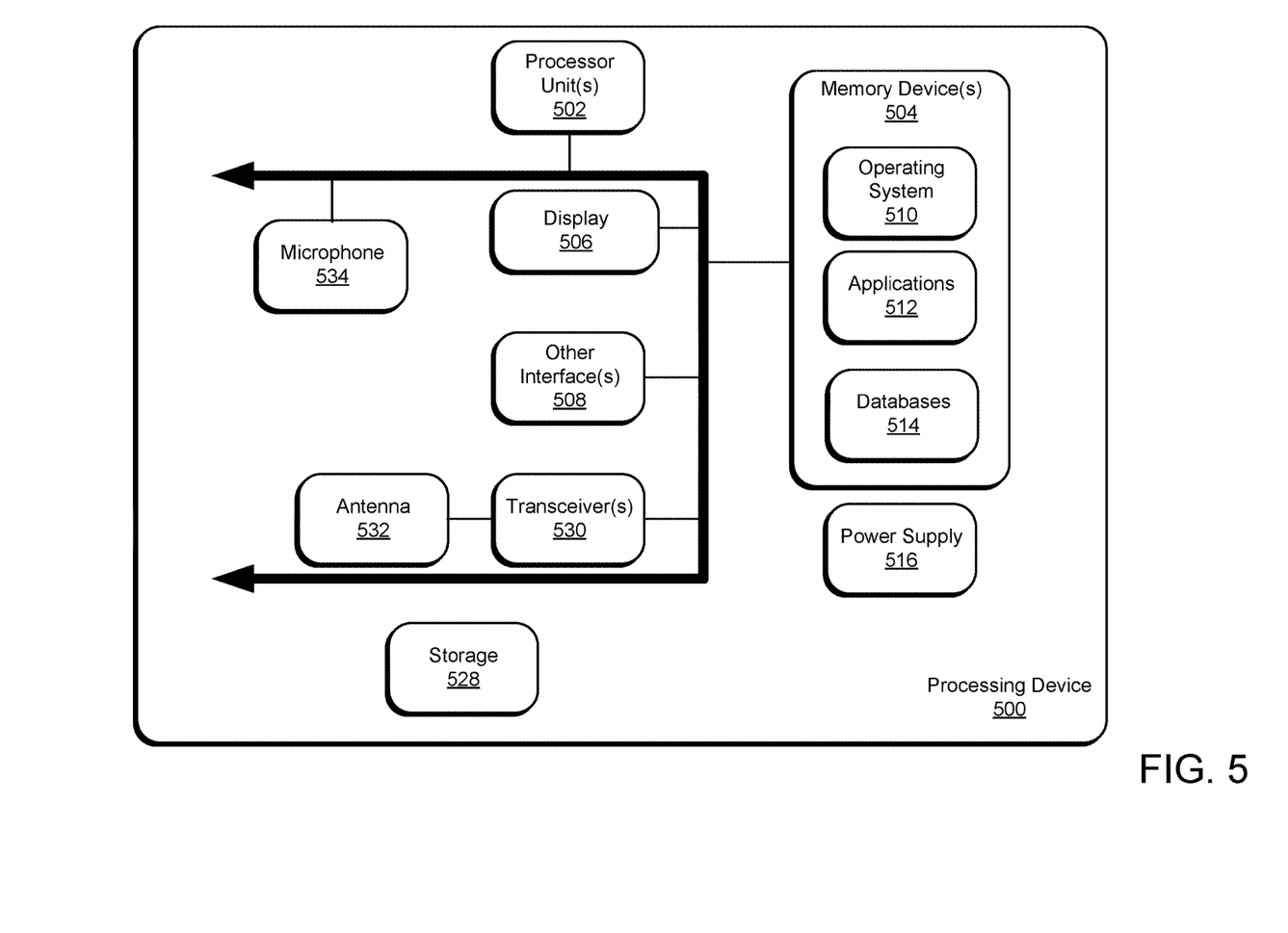
FIG. 5 illustrates an example schematic of a processing device suitable for implementing aspects of the disclosed technology.

FIG. 5 illustrates an example schematic of a processing device 500 suitable for implementing aspects of the disclosed technology. The example processing device 500 includes one or more processor(s) 502, one or more memory devices 504, a display 506, and other interfaces 508 (e.g., buttons). The memory device 504 generally includes both volatile memory (e.g., RAM) and non-volatile memory (e.g., flash memory). An operating system 510, such as the Microsoft Windows® operating system, the Microsoft Windows® Phone operating system, or a specific operating system designed for a gaming device, resides in the memory device 504 and is executed by the processor unit(s) 502, although it should be understood that other operating systems may be employed.

One or more applications 512, such as a function inspector, position-dependent bit masker, hashing engine, and comparator are loaded in the memory device 504 and executed on the operating system 510 by the processor(s) 502. The applications 512 may receive input from the display 506 included in the processing device 500, and also may interface with one or more databases 514, such as a hash table including various function records. The example processing device 500 includes a power supply 516, which is powered by one or more batteries or other power sources and which provides power to other components of the processing device 500. The power supply 516 may also be connected to an external power source that overrides or recharges the built-in batteries or other power sources.

The processing device 500 includes one or more communication transceivers 530 and an antenna 532 to provide network connectivity (e.g., a mobile phone network, Wi-Fi®, BlueTooth®, etc.). The processing device 500 may also include various other components, such as a positioning system (e.g., a global positioning satellite transceiver), one or more accelerometers, one or more cameras, an audio interface (e.g., a microphone 534, an audio amplifier and speaker and/or audio jack), and additional storage devices 528. Other configurations may also be employed.

In an example implementation, a mobile operating system, various applications (including a stylus position detection engine) and other modules and services may be embodied by instructions stored in memory device 504 and/or storage devices 528 and processed by the processing unit(s) 502. The memory device 504 may be memory of a host device or of an accessory that couples to a host. Some or all aspects of the processing device 500 described with respect to FIGS. 1-4, above, may be saved in memory internal or external to the processing device 500 and executed by a processor internal or external to the processing device 500.

The processing device 500 may include a variety of tangible processor-readable storage media and intangible processor-readable communication signals. Tangible processor-readable storage can include both volatile and nonvolatile storage media, removable and non-removable storage media. Tangible processor-readable storage media excludes intangible and transitory communications signals and includes volatile and nonvolatile, removable and non-removable storage media implemented in any method or technology for storage of information such as computer readable instructions, data structures, program modules or other data. Tangible processor-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the processing device 500. In contrast to tangible processor-readable storage media, intangible processor-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example and not limitation, intangible communication signals include wired media such as a wired network or direct-wired connection, and wireless media such as acoustic, RF, infrared and other wireless media.

Some embodiments may comprise an article of manufacture. An article of manufacture may comprise a tangible storage medium to store logic. Examples of a storage medium may include one or more types of processor-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

An example method for identifying duplicate machine code function implementations includes identifying position-dependent bits within a first function included in a first executable image and masking the position-dependent bits to create a position-independent entity. The method further includes hashing the position-independent entity to generate a representative hash code and comparing the representative hash code to a table of hash codes to identify at least one duplicate implementation of the first function. The duplicate implementation of the first function is associated in memory with a second executable image.

In an example method of any preceding method, each hash code in the table of hash codes is associated in memory with a function record including a position-independent entity that corresponds to a position-dependent function and the position-independent entity includes masked bits at locations corresponding to position-dependent bits in the position-dependent function.

In another example method of any preceding method, the table of hash codes includes a plurality of hash codes each associated in memory with at least one function record representing a function that satisfies a minimum length condition.

In still another example method of any preceding method, the method further includes using metadata of the first executable image to identify the position-dependent bits within the first function.

In another example method of any preceding method, the method further includes parsing the first function to identify boundaries for a plurality of instructions; comparing each instruction of the plurality of instructions to a predefined set of position-dependent instructions; and accessing a table to identify an applicable mask for the first instruction responsive to a determination that a first instruction of the plurality of instructions matches an instruction of the predefined set. Masking the position-dependent bits further includes applying the mask to create a position-independent instruction.

In still another example method of any preceding method, the hashing operation applies a secure hash algorithm (SHA) cryptographic hash.

In yet another example method of any preceding method, the method includes presenting to a user one or more function attributes of the identified at least one duplicate implementation of the function.

In another example method of any preceding method, the presented function attributes include a reference to the second executable image.

An example system for identifying duplicate machine code function implementations includes a means for identifying position-dependent bits within a first function included in a first executable image and a means for masking the position-dependent bits to create a position-independent entity. The system further includes a means for hashing the position-independent entity to generate a representative hash code and a means for comparing the representative hash code to a table of hash codes to identify at least one duplicate implementation of the first function. The duplicate implementation of the first function is associated in memory with a second executable image.

An example system includes a function inspector stored in memory and executable by a processor to identify position-dependent bits within a first function included in a first executable image; a position-dependent bit masker stored in the memory and executable by the processor to mask the position-dependent bits in the first function to create a position-independent entity; a hashing engine stored in the memory and executable by the processor to hash the position-independent entity to generate a representative hash code; and a comparator stored in the memory and executable by the processor to compare the representative hash code to a table of hash codes to identify at least one duplicate implementation of the first function. The duplicate implementation of the first function is associated in memory with a second executable image.

In another example system of any preceding system, each hash code in the table of hash codes is associated in the memory with a function record including a position-independent entity that corresponds to a position-dependent function and the position-independent entity includes masked bits at locations corresponding to position-dependent bits in the position-dependent function.

In still another example system of any preceding system, the function inspector identifies the position-dependent bits within the first function based on metadata of the first executable image.

In yet another example system of any preceding system, the table of hash codes includes a plurality of hash codes each associated with at least one function record defining a function that satisfies a minimum length condition.

In another example system of any preceding system, the function inspector is further executable to parse the function to identify instruction boundaries of a plurality of instructions and to compare a first instruction of the plurality of instructions to a predefined set of instructions known to be position-dependent, and wherein the position-dependent bit masker is executable to access a table to identify an applicable mask for the first instruction responsive to a determination that the first instruction matches an instruction of the predefined set.

In still another example system of any preceding system, the hashing engine applies an SHA-1 cryptographic hash.

In yet another example system of any preceding system, the comparator is further executable to present to a user one or more function attributes of the identified at least one duplicate implementation of the function.

In another example system of any preceding system, the presented function attributes include a reference to the second executable image.

One or more tangible processor-readable storage media of a tangible article of manufacture encodes computer-executable instructions for executing on a computer system a computer process including: masking position-dependent bits in a first position-dependent function to create a position-independent entity; applying a hashing function to the position-independent entity to generate a first representative hash code; and updating a database to store the first representative hash code in association with the position-independent entity and a reference to an executable image that includes the first position-dependent function; and querying the database with a second representative hash code associated with a second position-dependent function to determine whether the first position-dependent function and the second position-dependent function are duplicate function implementations of one another.

In another example computer-readable storage media of any preceding computer-readable storage media, the database includes a hash table including a plurality of hash codes each stored in association with at least one position-independent entity that includes masked bits at locations corresponding to position-dependent bits in an associated position-dependent function.

In still another example computer-readable storage media of any preceding computer-readable storage media, each hash code of the plurality of hash codes in the hash table is stored in association with the position-independent entity and a reference to at least one executable image including a position-dependent function used to generate the position-independent entity.

In yet another example computer-readable storage media of any preceding computer-readable storage media, the computer process further includes presenting one or more function records associated with the second representative hash code responsive to the querying of the database.

The above specification, examples, and data provide a complete description of the structure and use of exemplary implementations. Since many implementations can be made without departing from the spirit and scope of the claimed invention, the claims hereinafter appended define the invention. Furthermore, structural features of the different examples may be combined in yet another implementation without departing from the recited claims.

What is claimed is:

1. A method for identifying duplicate machine code function implementations, the method comprising:
   identifying, by one or more processors, position-dependent bits within a first function included in a first executable image;
   masking, by the one or more processors, the position-dependent bits within the first function to create a position-independent entity;
   applying, by the one or more processors, a hashing function to the position-independent entity to generate a representative hash code;
   querying, by the one or more processors, a database including a table of hash codes to compare the representative hash code to the table of hash codes, each hash code in the table of hash codes being associated in the memory with a function record including a position-independent entity that corresponds to a position-dependent function, the position-independent entity including masked bits at locations corresponding to position-dependent bits within the position-dependent function; and
   identifying, by the one or more processors, at least one duplicate implementation of the first function based on the comparison, the identified at least one duplicate implementation of the first function being associated in the memory with a second executable image.

2. The method of claim 1, wherein the table of hash codes includes a plurality of hash codes each being associated in the memory with at least one function record defining a function that satisfies a minimum length condition.

3. The method of claim 1, further comprising:
   identifying, by the one or more processors, the position-dependent bits within the first function based on metadata of the first executable image.

4. The method of claim 1, further comprising:
- parsing, by the one or more processors, the first function to identify instruction boundaries of a plurality of instructions;
- comparing, by the one or more processors, each instruction of the plurality of instructions to a predefined set of position-dependent instructions; and
- responsive to a determination that a first instruction of the plurality of instructions matches an instruction of the predefined set of position-dependent instructions, accessing, by the one or more processors, a table to identify an applicable mask for the first instruction of the plurality of instructions, wherein masking the position-dependent bits within the first function includes applying the applicable mask to create a position-independent instruction.

5. The method of claim 1, wherein the hashing function is a secure hash algorithm (SHA) cryptographic hash.

6. The method of claim 1, further comprising:
- presenting, by the one or more processors, to a user one or more function attributes of the identified at least one duplicate implementation of the first function.

7. The method of claim 6, wherein the presented one or more function attributes include a reference to the second executable image.

8. A system comprising:
- a processor;
- a memory;
- a function inspector stored in the memory and executable by the processor to identify position-dependent bits within a first function included in a first executable image;
- a position-dependent bit masker stored in the memory and executable by the processor to mask the position-dependent bits within the first function to create a position-independent entity;
- a hashing engine stored in the memory and executable by the processor to apply a hashing function to the position-independent entity to generate a representative hash code; and
- a comparator stored in the memory and executable by the processor to:
- query a database including a table of hash codes to compare the representative hash code to the table of hash codes, each hash code in the table of hash codes being associated in the memory with a function record including a position-independent entity that corresponds to a position-dependent function, the position-independent entity including masked bits at locations corresponding to position-dependent bits within the position-dependent function; and
- identify at least one duplicate implementation of the first function based on the comparison, the identified at least one duplicate implementation of the first function being associated in the memory with a second executable image.

9. The system of claim 8, wherein the function inspector is further executable by the processor to identify the position-dependent bits within the first function based on metadata of the first executable image.

10. The system of claim 8, wherein the table of hash codes includes a plurality of hash codes each being associated in the memory with at least one function record defining a function that satisfies a minimum length condition.

11. The system of claim 8, wherein the function inspector is further executable by the processor to parse the first function to identify instruction boundaries of a plurality of instructions and to compare each instruction of the plurality of instructions to a predefined set of position-dependent instructions, wherein the position-dependent bit masker is further executable by the processor to, responsive to a determination that a first instruction of the plurality of instructions matches an instruction of the predefined set of position-dependent instructions, access a table to identify an applicable mask for the first instruction of the plurality of instructions, and wherein masking the position-dependent bits within the first function includes applying the applicable mask to create a position-independent instruction.

12. The system of claim 8, wherein the hashing engine applies a secure hash algorithm (SHA) cryptographic hash.

13. The system of claim 8, wherein the comparator is further executable by the processor to present to a user one or more function attributes of the identified at least one duplicate implementation of the first function.

14. The system of claim 13, wherein the presented one or more function attributes include a reference to the second executable image.

15. One or more tangible processor-readable storage media of a tangible article of manufacture encoding computer-executable instructions for executing on a computer system a computer process, the computer process comprising:
- identifying, by a processor, position-dependent bits within a first position-dependent function included in an executable image;
- masking, by the processor, the position-dependent bits within the first position-dependent function to create a position-independent entity;
- applying, by the processor, a hashing function to the position-independent entity to generate a first representative hash code;
- updating, by the processor, a database to store the first representative hash code being associated with the position-independent entity and a reference to the executable image that includes the first position-dependent function, the database including a hash table storing a plurality of hash codes, each hash code of the plurality of hash codes in the hash table being associated with a function record including a position-independent entity that corresponds to a position-dependent function, the position-independent entity including masked bits at locations corresponding to position-dependent bits within the position-dependent function; and
- querying, by the processor, the database with a second representative hash code being associated with a second position-dependent function to compare the first representative hash code being associated with the position-independent entity and the second representative hash code being associated with the second position-dependent function to determine whether the first position-dependent function and the second position-dependent function are duplicate function implementations of one another.

16. The one or more tangible processor-readable storage media of claim 15, wherein the computer process further comprises presenting, by the processor, one or more function records being associated with the second representative hash code responsive to the querying of the database.

* * * * *